(12) United States Patent
Goossens et al.

(10) Patent No.: US 8,398,912 B2
(45) Date of Patent: Mar. 19, 2013

(54) APPARATUS AND METHOD FOR REMOVING MOLDED ARTICLES FROM THEIR MOLDS

(75) Inventors: Francies Petrus Joseph Goossens, Bornem (BE); Dominique Suzanne François Surinx, Bornem (BE); Stefaan Jaak Vanquickenborne, Bornem (BE)

(73) Assignee: Capsugel Belgium NV, Bornem (BE)

( * ) Notice: Subject to any disclaimer, the term of this patent is extended or adjusted under 35 U.S.C. 154(b) by 524 days.

(21) Appl. No.: 12/376,326

(22) PCT Filed: Jul. 27, 2007

(86) PCT No.: PCT/IB2007/002224
§ 371 (c)(1),
(2), (4) Date: Nov. 5, 2009

(87) PCT Pub. No.: WO2008/015555
PCT Pub. Date: Feb. 7, 2008

(65) Prior Publication Data
US 2010/0052221 A1 Mar. 4, 2010

Related U.S. Application Data

(60) Provisional application No. 60/821,411, filed on Aug. 4, 2006.

(30) Foreign Application Priority Data
Aug. 9, 2006 (EP) .................................... 06118697

(51) Int. Cl.
*B29C 45/42* (2006.01)
(52) U.S. Cl. .......................... 264/334; 425/444; 425/556
(58) Field of Classification Search .................. 425/444, 425/556, 572, DIG. 5, DIG. 58; 264/334
See application file for complete search history.

(56) References Cited

U.S. PATENT DOCUMENTS 3,669,592 A * 6/1972 Miller ........................... 425/155
3,910,748 A * 10/1975 Kopernik ....................... 425/444
(Continued)

FOREIGN PATENT DOCUMENTS

DE 4318014 C1 6/1994
EP 1211042 A 6/2002
(Continued)

OTHER PUBLICATIONS

Partial Translation of JP 2000-197936.
(Continued)

*Primary Examiner* — Yogendra Gupta
*Assistant Examiner* — Emmanuel S Luk
(74) *Attorney, Agent, or Firm* — Finnegan, Henderson, Farabow, Garrett & Dunner, LLP (57) ABSTRACT

The present invention relates to a method and apparatus for removing a plurality of molded articles from respective molds each having an external molding surface oriented according to a mold axis (X), said molds (12) being arranged with their axis (X) parallel. The apparatus comprises a plurality of pairs of jaws (4,6), each corresponding to a respective mold (12) and including a first jaw (4) and an opposed second jaw (6) which are moveable with respect to the respective mold (12) according to a first relative motion, between an open position wherein the jaws (4, 6) are spaced apart from the mold (;12) and a closed position wherein the jaws (4, 6) engage the mold (12), and a substantially axial second relative motion, wherein the pair of jaws (4,6) is slidably displaced along the mold axis (X) so as to remove it from the mold (12). The jaws (4, 6), for the first relative motion, are linearly moveable in parallel directions which are radial to the respective mold axis (X).

19 Claims, 5 Drawing Sheets

U.S. PATENT DOCUMENTS

| | | | |
|---|---|---|---|
| 4,140,464 A | 2/1979 | Spurr et al. | |
| 4,299,371 A * | 11/1981 | Duga | 249/68 |
| 4,412,806 A | 11/1983 | Gaiser et al. | |
| 4,551,086 A | 11/1985 | Rawlings | 425/425 |
| 5,470,221 A | 11/1995 | Gaiser | 425/556 |
| 5,531,588 A * | 7/1996 | Brun et al. | 425/556 |
| 6,267,574 B1 * | 7/2001 | Bowman et al. | 425/78 |
| 6,334,766 B1 * | 1/2002 | McCormick | 425/165 |
| 6,461,141 B1 | 10/2002 | Harrison et al. | 425/556 |
| 6,767,497 B2 * | 7/2004 | Knepper et al. | 264/334 |
| 6,799,962 B2 * | 10/2004 | Mai et al. | 425/556 |
| 7,708,919 B2 * | 5/2010 | Patterson et al. | 264/40.5 |
| 2003/0107155 A1 * | 6/2003 | Olaru et al. | 264/328.1 |

FOREIGN PATENT DOCUMENTS

| | | |
|---|---|---|
| GB | 1374714 | 11/1974 |
| JP | S54-004960 | 1/1979 |
| JP | 2000-197936 | 7/2000 |
| KR | 20-0210750 | 1/2001 |
| WO | WO9107267 | 5/1991 |

OTHER PUBLICATIONS

English Abstract of DE 4318014C1.

English Abstract of KR 20-0210750.

\* cited by examiner

APPARATUS AND METHOD FOR REMOVING MOLDED ARTICLES FROM THEIR MOLDS

This application is a national stage application under 35 U.S.C. 371 of PCT/IB2007/002224filed Jul. 27, 2007, which claims the benefit of U.S. Patent Application Number 60/821,411 filed Aug. 4, 2006 and European Patent Application Number 06118697.9, filed on Aug. 9, 2006.

The present invention relates to an apparatus and method for removing molded articles from their molds. In particular, it relates to the removal of molded articles which have been formed around a respective mold.

More specifically, the invention relates to an apparatus for removing a plurality of molded articles from respective molds each having an external molding surface oriented according to a mold axis, said molds being arranged with their axis parallel, the apparatus comprising a plurality of pairs of jaws, each corresponding to a respective mold and including a first jaw and an opposed second jaw which are moveable with respect to the respective mold according to a first relative motion, between an open position wherein the jaws are spaced apart from the mold and a closed position wherein the jaws engage the mold or the molded article, and a substantially axial second relative motion, wherein the pair of jaws is slidably displaced along the mold axis so as to axially displace the respective molded article and remove it from the mold.

Conventionally, molded articles which have been formed around respective molds are removed from their molds by a removal apparatus which comprises a plurality of scissor-like clamps having a pair of arms which pivot about one end and have a pair of engagement surfaces at the other end. When in an open position, each scissor-like clamp is able to receive a respective molded article, still carried by its mold, between its engagement surfaces. The arms of each clamp are then caused to contrarotate about their pivot point, thus bringing the engagement surfaces into contact with the molded article. With the molded article engaged by the engagement surfaces, the clamp is then moved laterally away from the mold to remove the molded article therefrom.

An alternative known method uses a similar apparatus, but the engagement surfaces of the arms contact the mold and are then moved towards the molded article such that the molded article is contacted by the arms and pushed from the mold.

However, there are a number of problems associated with the above-described conventional methods for removing molded articles. In particular, with the pivoting arms of the scissor-like clamps known in the art, any misalignment with the molds can cause damage to the molded articles. If there is even a relatively small degree of misalignment, the clamps can contact the molded articles as they are entering the removal apparatus. This can cause the molded articles to be torn or it can cause holes or weaknesses within the walls of the molded article. In order to avoid damaging the molded articles, the molds need to be aligned very precisely with the open clamps.

Additionally, it is difficult to control the force with which the clamps engage the molds or molded articles. This results in a relatively large amount of a release agent being required to ensure the molded articles can be removed from the molds with the minimum of damage to the articles. The release agent is typically applied to the mold prior to molding and the amount that is applied can affect both the process time and the quality of the end product.

Furthermore, the conventional apparatus and method used to remove molded articles tends to generate relatively large forces and the articles being removed from their molds can experience quite harsh conditions. Whilst this is not a problem for articles made from a relatively robust material, it can cause problems when trying to remove articles made from relatively delicate materials, as these are easily damaged by the known apparatus and method.

The object of the invention is to overcome or ameliorate at least one of the above-mentioned problems and/or to improve the efficiency by which molded articles can be removed from their respective molds.

To this end; according to a first aspect, the present invention provides an apparatus of the type exposed above, characterized in that the jaws, for the first relative motion, are linearly moveable in parallel directions which are radial to the respective mold axis.

Advantageously, the apparatus of the invention may have one or more of the following optional features:

the apparatus further comprises a first carrier carrying the first jaws and a second carrier carrying the second jaws, the first and second carriers being linearly moveable according to two successive orthogonal directions, so as to displace the jaws according to their first relative motion, between their open position and their closed position on their respective molds, and their substantially axial second relative motion;

each of the first jaws is slidably coupled to the first carrier and each of the second jaws is slidably coupled to the second carrier, in such a way that each of the first and second jaws is capable of moving with respect to the respective carrier in a first direction corresponding to the direction defined by the first relative motion of the first and second jaws towards and away from each other;

each of the first jaws is slidably coupled to the first carrier and each of the second jaws is slidably coupled to the second carrier, in such a way that each of the first and second jaws is capable of moving with respect to the respective carrier in a second direction substantially orthogonal to the mold axis and to the direction defined by the first relative motion of the first and second jaws, so as to compensate the misalignment between a pair of jaws and the respective mold;

the apparatus further comprises stop elements adapted to constrain the movement of the first and second jaws relative to their respective carriers;

the apparatus further comprises resiliently deformable members each interposed between a jaw and the respective carrier and adapted to bias the first and second jaws into their closed position;

the apparatus further comprises a first drive mechanism capable of moving the jaws of each pair between the open and closed positions, and a second drive mechanism capable of axially moving the jaws;

the molds are arranged in a line defining a mold plane, the first drive mechanism causing the jaws to move in a first plane perpendicular to the mold plane and the second drive mechanism causing the jaws to move along a second plane corresponding to the mold plane;

the first plane is a vertical plane and the second plane is a horizontal plane;

each jaw includes a recess which is shaped and configured for engaging the mold or molded article;

the apparatus further includes a mold receiving passage adapted to receive therein a mold together with its associated molded article;

the mold receiving passage includes an alignment element capable of aligning the mold with a respective pair of jaws;

the first and second drive mechanisms each include a drive source independently selected from electrical, mechanical, pneumatic and hydraulic;

the first and second drive mechanisms share a common drive source; and the first and/or second drive source is a mechanical drive source including a drive shaft.

By having the opposed jaws of each pair of jaws carried by a respective carrier, it is easier to control the jaws and address the problems mentioned above in connection with the conventional removal apparatus.

The term "drive mechanism" is to be understood as either a single component that is capable of moving the jaws or the jaw carriers, or as an assembly of components which cooperate to effect the required movement.

In an embodiment of the invention, each pair of jaws engages a respective molded article. The molded article may be of any shape and size, provided it has been formed around a mold and may be removed by stripping it from its mold. For example, the molded article may be tubular in shape, having a regular cross-section which may be square, triangular, circular, etc. Alternatively, it may be conical, frusto-conical or pyramidal in shape.

The movement of the jaws in two perpendicular planes allows the jaws of each pair to engage or contact a respective molded article and to remove it from its mold in an efficient manner.

Optionally, the first and second drive mechanisms are controlled such that the second drive mechanism moves the jaws whilst they are in the closed position.

The first and/or second drive mechanism may act on the jaws or each pair of jaws directly or they may act on them via the respective jaw carriers. Thus, the first drive mechanism may act on the first and/or second jaw carriers to move each pair of jaws from the open to the closed position, or from the closed to the open position. Likewise, the second drive mechanism may act on the first and second jaw carriers to move each pair of jaws from the first to second positions or vice versa.

Having the first and second jaws slidably coupled to their respective carriers allows the apparatus to adjust to small misalignments between a pair of jaws and a respective mold. Thus, if a mold is not correctly aligned with a respective pair of jaws, the degree of play afforded by having the first and second jaws slidably coupled to their carriers can accommodate this without damaging the molded article, the mold and/or the jaws.

In embodiments where there is provided a single stop element to constrain the movement of the first and second jaws relative to their respective carriers, this may be formed by a pin and aperture type arrangement, where one of the carrier and the jaw is provided with a pin and the other of the carrier and the jaw is provided with an aperture, wherein the diameter of the aperture is greater than the diameter of the pin and the pin is free to move within the aperture. In this arrangement, the degree of play afforded to each jaw is defined by the difference between the diameter of the aperture and the diameter of the pin. Of course, the pin and/or the aperture may have a non-circular cross-section (for example, the aperture may be oval in shape). In this case, the degree of play (i.e. the distance the jaw can move relative to the carrier) is defined by the difference in the diameters of the pin and the aperture in the direction of movement, where diameter is taken to mean the distance between the opposing sides of the aperture and/or the opposing sides of the pin.

The provision of resiliently deformable members such as compression springs is advantageous, as it allows the force applied by the jaws to be controlled. In particular, the force that each jaw applies to the mold or the molded article may be predetermined, as it is related to the restoring force exerted by the resiliently deformable member. Being able to control the force exerted by each jaw means that molded articles made from relatively delicate materials can be treated more gently, thus reducing damage to the articles. Additionally, it may be possible to use less release fluid in such embodiments.

The first jaw carrier is preferably a unitary construction that carries all of the first jaws and the second jaw carrier is preferably a unitary construction that carries all of the second jaws.

Each of the first and second jaw carriers may be a bar and the jaws may be carried within a channel formed within the bar along its longitudinal axis.

The first and second jaw carriers each may comprise a bar including a channel along the longitudinal axis of the bar, the channel being defined by opposed walls of the bar, wherein a portion of each of the jaws is carried within the channel and each jaw includes an aperture therethrough, whereby each jaw is constrained within its respective channel by a pin which passes through the aperture and is attached to at least one of the opposed walls of the channel. The cross-sectional area of the aperture may be greater than the cross-sectional area of the pin, whereby each jaw has a degree of play (in other words is capable of moving within a constrained range) within a defined plane, for example the vertical or horizontal plane.

The recess of the jaws shaped and configured to engage the mold or the molded article may be arcuate where the molded article has a circular cross-section, or it may angled to receive a mold or molded article having a non-circular shaped cross-section. The recess allows each jaw to engage a greater surface area of the mold or the molded article and thus spread the engagement force of the jaws to reduce the pressure on the molded article to be removed.

The apparatus may be stationary and the molds may be transported to the apparatus following the molding process. In such cases, the mold may enter and leave the mold receiving passage via a single opening or the passage may include an first opening through which the molds may enter the apparatus and a second opening through which the molds may exit the apparatus after having had their associated molded articles removed.

The alignment element may be capable of aligning a plurality of molds with their respective jaws. Having each mold properly aligned with its respective pair of jaws reduces wear and the risk of damage to both the mold and the jaws. It also reduces the risk of damage to the molded article during its removal from the mold.

The alignment element may include a stop or it may form part of a mold transport assembly, where movement of the molds is controlled to affect the alignment of each mold with its respective pair of jaws. Thus the alignment element may be a control element or programme within the mold transport assembly.

According to a second aspect of the invention, there is provided a method of removing a plurality of molded articles from respective molds, each having an external molding surface oriented according to a mold axis, said molds being arranged with their axis parallel, the method comprising the following successive steps:

(i) aligning each mold with a respective pair of jaws, each pair of jaws including a first jaw and an opposed second jaw;

(ii) moving the first and second jaws of each pair according to a first relative motion from an open position, wherein the first and second jaws are spaced apart from the mold, to a closed position, wherein the jaws engage the mold or the molded article, said first motion of the pairs of jaws being made linearly in parallel directions which are radial to the respective mold axis;

(iii) moving the pairs of jaws according to a substantially axial second relative motion, wherein each pair of jaws is slidably displaced along the mold axis so as to axially displace the respective molded article and remove it from the mold.

Thus, in step (iii), each molded article is either engaged by a respective pair of jaws or the pair of jaws are brought into contact with the molded article during the axial movement and the molded article is thus slid or stripped from its mold.

Preferably, the first jaws are carried by a first carrier and the second jaws being carried by a second carrier, the first motion of the first and second jaws from the open position to the closed position being achieved by movement of the respective carriers.

Still preferably, the first jaws are carried by a first carrier and the second jaws being carried by a second carrier, the substantially axial second motion of each pair of jaws being achieved by movement of the respective carriers.

Unless otherwise stated, the above-described preferred or optional features are not intended to be mutually exclusive. Accordingly, any two or more of the individual features described above can be combined with the first or second aspects of the invention.

An embodiment of the invention will be described, by way of example only, with reference to the accompanying drawings in which.

With regard to the embodiment specifically described hereinbelow, reference to directions such as up, down, left, right, upper, lower, etc. refer to the orientation of the embodiment as shown in the Figures and is not intended to be limiting.

Figure 1:
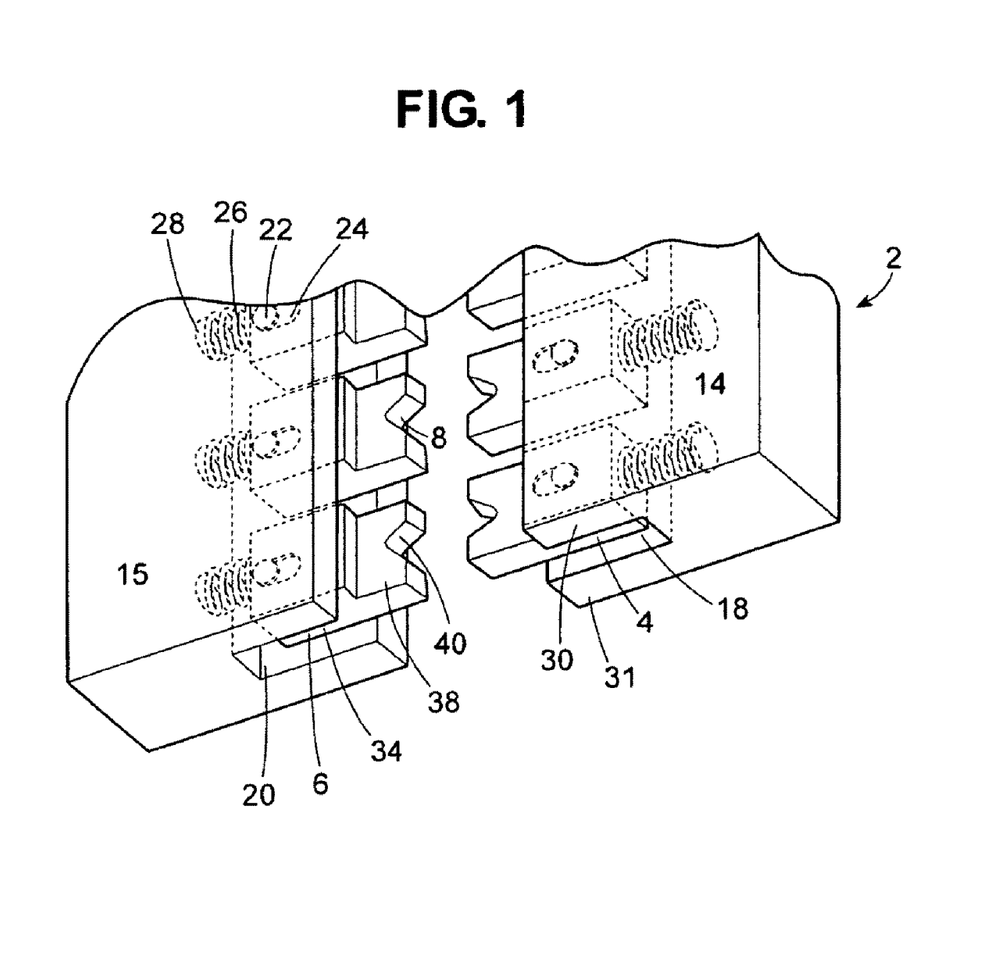
FIG. 1 is a schematic perspective view of an apparatus according to the invention, the pairs of jaws being in open position.

FIG. 1 shows in general a portion of a removal apparatus 2 according to the present invention. The apparatus includes a plurality of pairs of opposed jaws, each comprising a first jaw 4 and a second jaw 6. Each first jaw 4 is partially located within a channel 18 of a first jaw carrier 14 and each second jaw 6 is partially located within a channel 20 of a second jaw carrier 15. The channel 18 of the first jaw carrier 14 is defined by opposed walls 30, 31 of the first carrier 14 and the channel 20 of the second carrier 15 is similarly formed by opposing wall elements.

Each of the jaws 4, 6 includes a retained portion 34 which is located within the channel corresponding 18, 20 and a projecting portion 38 which extends outwardly of the channel 18, 20. The projecting portion 38 includes a shaped recess 40 which is sized and configured to receive a portion of a mold 12 or a molded article 10 carried on the mold 12. The recess 40 defines an engagement surface 8 which is capable of engaging the mold 12 or the molded article 10.

As visible on FIGS. 2-5, the molds 12 have an elongated shape, each mold having an external molding surface oriented according to a mold axis X. In the example shown the molds have a square cross-section, but it will be appreciated that several different types of cross-sections could be envisaged, especially circular cross-sections. The molds are arranged with their axis X parallel to a common direction.

In the following, the term "axial" refers to this common direction corresponding to the mold axis X. The term "radial" is defined with reference to a specific mold as perpendicular to the axis X of this mold.

The retained portion 34 of each first jaw 4, 6 is secured within the corresponding channel 18, 20 by a pin 22 which passes through an aperture 24 located through the retained portion 34 and is fixed to the opposed walls of the channel 18, 20. The aperture 24 has a diameter which is greater than the diameter of the pin 22 and thereby provides each first jaw 4 with a degree of play within the channel. In other words the jaw 4, 6 is able to move within a constrained range defined by the difference in the diameters of the pin 22 and the aperture 24. Movement of each jaw 4, 6 in and out of the channel 18, 20 is controlled by a coil spring 26 which is housed within a cylindrical bore 28 formed within the carrier 14, extending from the channel 18, 20 away from the jaws 4, 6. The spring 26 is arranged such one end engages a contact surface of the cylindrical bore 28 and the other end contacts the retained portion 34 of the jaw 4, 6, whereby each first jaw 4, 6 is urged towards the corresponding opposed jaw.

Each second jaw 6 is arranged to be the mirror image of the corresponding first jaw 4.

The apparatus 2 includes a mold receiving channel (not shown), which includes a mold opening and a mold exit, through which the molds 12 can enter and exit the apparatus 2. In the embodiment shown in FIGS. 2, 3, 4 and 5, a plurality of molds 12 are carried on common carrier 16. The mold assembly formed of the plurality of molds 12 and the common carrier 16 comprises, in the example shown, a plurality of identical molds arranged in a line defining a mold plane and have their free ends aligned at the same distance of the carrier 16.

The use of the apparatus is shown in FIGS. 2-5, where certain elements of the embodiment have been omitted for the purposes of clarity.

Figure 2:
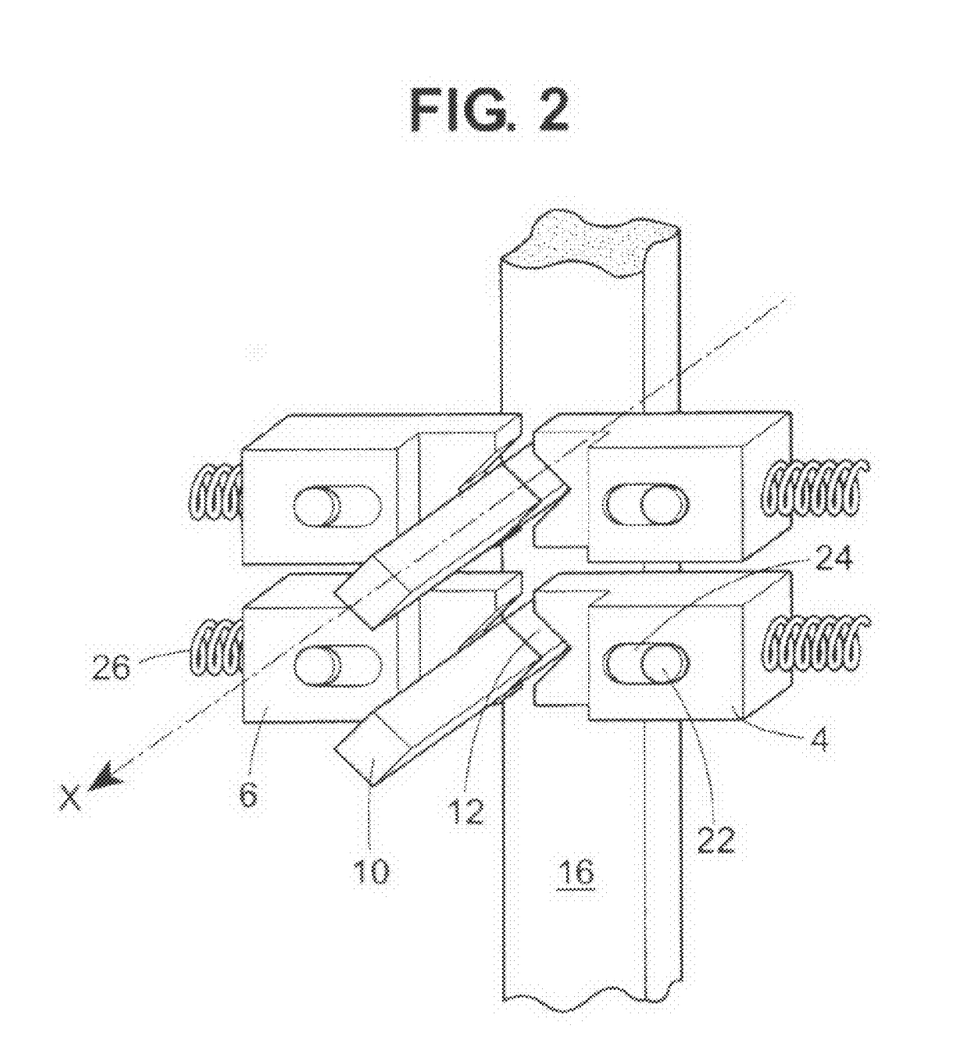
FIG. 2 is a schematic perspective view of the apparatus of FIG. 1 with a mold assembly, showing two pairs of jaws in open position aligned with their respective molds prior to removal of the molded articles.

In FIG. 2, the apparatus is in its start position, where the jaws 4, 6 are in an open position and have located therebetween the respective molded article 10 carried on its mold 12. The molds 12 are aligned with their respective pairs of jaws 4, 6 by controlling the movement of the common carrier 16. Suitable control mechanisms are well known to those skilled in the art and will not be discussed in detail herein.

Figure 3:
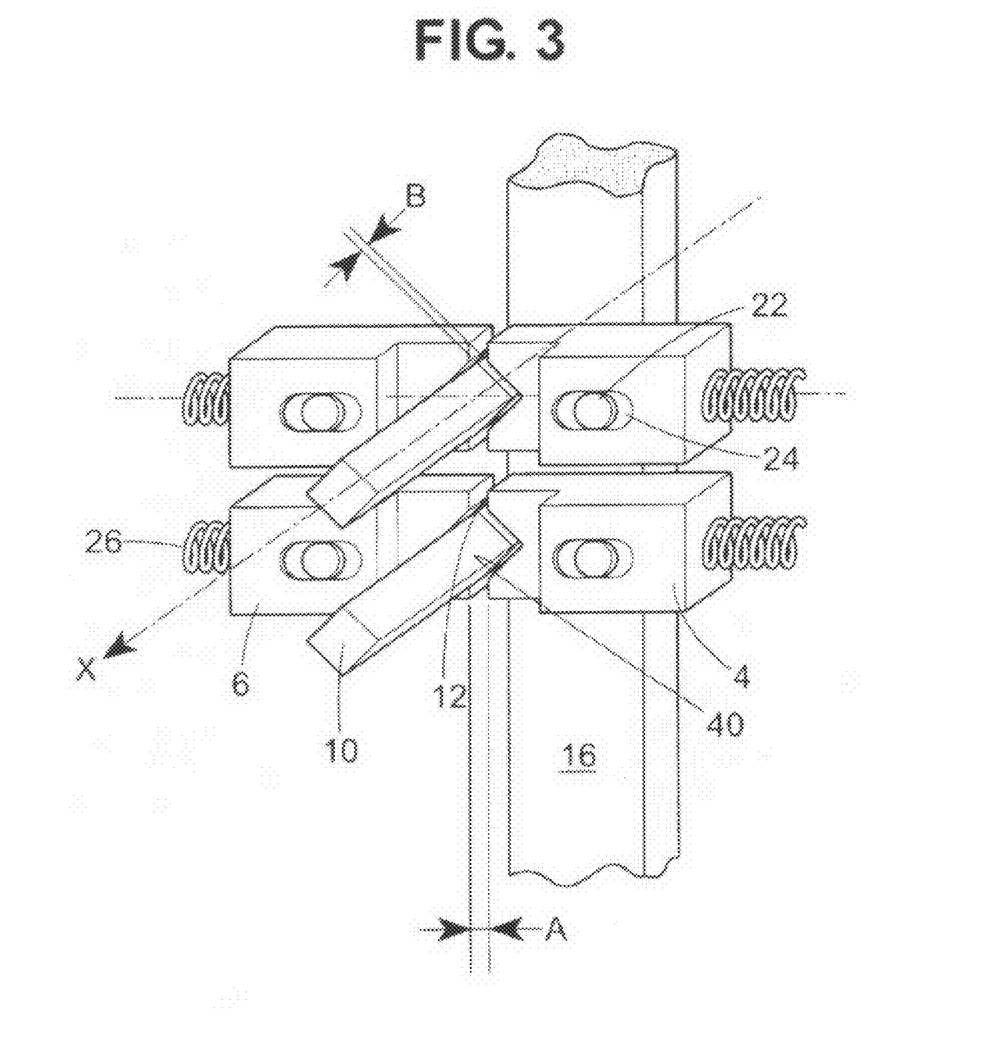
FIG. 3 is a schematic perspective view of the apparatus and mold assembly of FIG. 2, the two pairs of jaws being in their closed position.

In FIG. 3, the jaws 4, 6 are moved according to a first relative motion, which is linear and radial with respect to the mold axis X, to a closed position (shown by arrow A) wherein the engagement surface 8 of each jaw engages a respective portion of the mold 12. The jaws 4, 6 engage the mold 12 at a point which is spaced from the proximal end of the molded article 10, as shown by the gap B in FIG. 3.

All the pairs of jaws 4, 6 carried by the carriers 14, 15 are correspondingly moved in parallel in this first closing motion.

As the jaws 4, 6 move to the closed position, they contact the mold 12 and the carrier bars 14, 15 (not shown in FIG. 3) are then further driven towards each other by a small amount which is less than the degree of play afforded by the difference in diameter of the pin 22 and the aperture 24. This causes the respective springs 26 to be compressed and the jaws 4, 6 to exert a force on the mold 12 which is approximately equal to the restoring force of the spring 26.

The jaws 4, 6 are moved towards each other by driving the respective carriers 14, 15 to move towards each other. Suitable drive apparatus for driving the carriers 14, 15 to close (and open) the jaws 4, 6 will not be described in detail herein.

Figure 4:
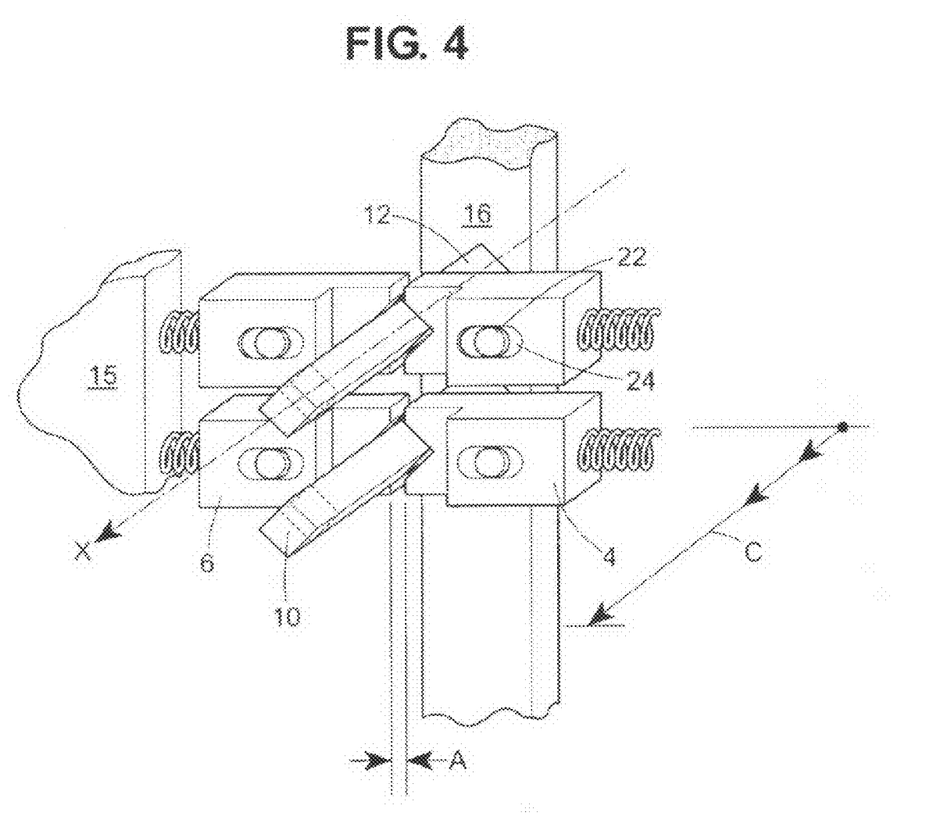
FIG. 4 is a schematic perspective view of the apparatus and mold assembly of FIG. 2, the two pairs of jaws being axially moved in the process of removing the molded article.

In FIG. 4, the jaws 4, 6 are maintained in the closed position. The jaw carriers 14, 15 are driven to move transversely relative to common mold carrier 16 (shown by arrow C). As each pair of jaws 4, 6 is urged transversely relative to the mold carrier 16, the jaws 4, 6 contact the proximal end of the respective molded article 10. Continued transverse movement of the jaws causes each of the molded articles 10 to be removed from their respective molds 12. Each molded article 10, which is being pushed by a pair of jaws 4, 6, is ejected from its mold 12 into or onto a respective receiving element (not shown).

In an alternative embodiment (not shown) the jaws 4, 6 may engage the molded article 10 directly.

Again, suitable drive mechanisms for moving the jaw carriers 14, 15 relative to the common mold carrier are well known to those skilled in the art and will not be described in detail herein.

Figure 5:
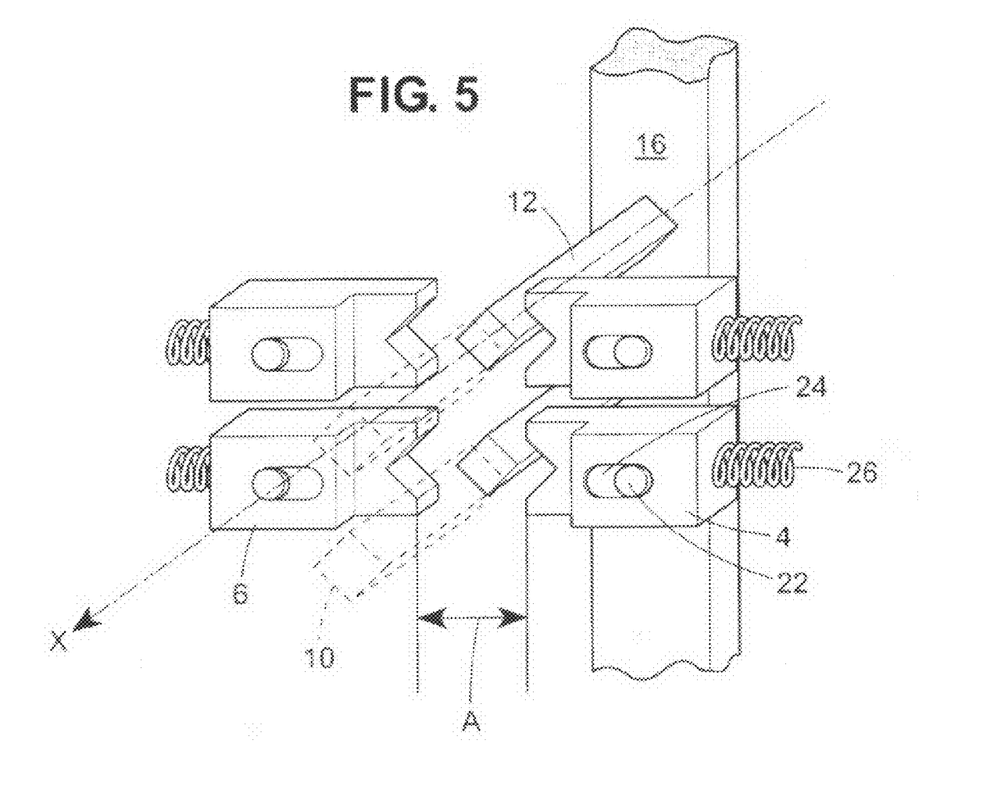
FIG. 5 is a schematic perspective view of the apparatus and mold assembly of FIG. 2, the two pairs of jaws being in their open position after removal of the molded article.

FIG. 5 shows the jaws 4, 6 and molds 12 after removal of the molded articles 10. The jaws 4, 6 are driven to their open position (shown by arrow A) by their respective carriers 14, 15 being driven away from each other. As shown in FIG. 5, when the jaws 4, 6 are opened, the springs 26 urge their respective jaws 4, 6 towards each other, with the movement caused by the springs 26 being arrested by the pin 22 contacting a stop surface of the aperture 24.

Following the release of the molded articles 10, the jaw carriers 14, 15 are returned to their start position shown in FIG. 2.

The apparatus and method described above are particularly suitable in a capsule manufacturing process for removing molded capsule parts, such as body and cap of two-part type capsules, from their respective molds. Such capsules are commonly used in pharmaceutical and dietary supplement industries.

The invention claimed is:

1. An apparatus for removing a plurality of molded articles from respective molds, comprising:
   each mold having an elongated shape with an elongated external molding surface oriented according to a mold axis, the elongated external molding surface directly contacting the respective molded article, said molds being arranged with their axes parallel, and a plurality of pairs of jaws, each corresponding to a respective mold and including a first jaw and an opposed second jaw which are moveable with respect to the respective mold according to a first relative motion, between an open position wherein the jaws are spaced apart from the mold and a closed position wherein the jaws engage the mold or the molded article, and a substantially axial second relative motion, wherein the pair of jaws is slidably displaced along the mold axis and around at least a portion of the molding surface so as to contact and axially displace the respective molded article and remove it from the mold, and wherein the jaws, for the first relative motion, are linearly moveable in parallel directions which are radial to the respective mold axis, and further comprising a first carrier carrying the first jaws and a second carrier carrying the second jaws, the first and second carriers being linearly moveable according to two successive orthogonal directions, so as to displace the jaws according to their first relative motion, between their open position and their closed position on their respective molds, and their substantially axial second relative motion.

2. An apparatus according to claim 1, wherein each of the first jaws is slidably coupled to the first carrier and each of the second jaws is slidably coupled to the second carrier, in such a way that each of the first and second jaws is capable of moving with respect to the respective carrier in a first direction corresponding to the direction defined by the first relative motion of the first and second jaws towards and away from each other.

3. An apparatus according to claim 2, wherein each of the first jaws is slidably coupled to the first carrier and each of the second jaws is slidably coupled to the second carrier, in such a way that the first and second jaws is capable of moving with respect to the respective carrier in a second direction substantially orthogonal to the mold axis and to the direction defined by the first relative motion of the first and second jaws, so as to compensate for misalignment between a pair of jaws and the respective mold.

4. An apparatus according to claim 3, further comprising stop elements adapted to constrain the movement of the first and second jaws relative to their respective carriers.

5. An apparatus according to claim 4, further comprising resiliently deformable members each interposed between a jaw and a respective carrier and adapted to bias the first and second jaws into their closed position.

6. An apparatus according to claim 5, further comprising a drive mechanism capable of moving the jaws of each pair between the open and closed positions, and a second drive mechanism capable of axially moving the jaws.

7. An apparatus according to claim 6, wherein the molds are arranged in a line defining a mold plane, the first drive mechanism causing the jaws to move in a first plane perpendicular to the mold plane and the second drive mechanism causing the jaws to move along a second plane corresponding to the mold plane.

8. An apparatus according to claim 7, wherein the first plane is a vertical plane and the second plane is a horizontal plane.

9. An apparatus according to claim 8, wherein each jaw includes a recess which is shaped and configured for engaging the mold or the molded article.

10. An apparatus according to claim 9, wherein the apparatus further includes a mold receiving passage adapted to receive therein a mold together with its associated molded article.

11. An apparatus according to claim 10, wherein the mold receiving passage includes an alignment element capable of aligning the mold with a respective pair of jaws.

12. An apparatus according to claim 11, wherein the first and second drive mechanisms each include a drive source independently selected from electrical, mechanical, pneumatic, and hydraulic.

13. An apparatus according to claim 12, wherein the first and second drive mechanisms share a common drive source.

14. An apparatus according to claim 13, wherein the first and/or second drive source is a mechanical drive source including a drive shaft.

15. An apparatus for removing a plurality of molded articles respectively from a plurality of molds, comprising:
   each mold having an elongated shape with an elongated external molding surface oriented according to a mold axis, the elongated external molding surface directly contacting a respective molded article, the molds being arranged such that a respective axis of one mold is substantially parallel to the respective axis of the other molds, and
   a plurality of pairs of jaws, each corresponding to a respective mold and including a first jaw and an opposed second jaw which are moveable with respect to the respective mold according to a first relative motion, between an open position wherein the jaws are spaced apart from the mold and a closed position wherein the jaws engage the mold or the molded article, and a substantially axial second relative motion,
  wherein the pair of jaws is slidably displaced along the mold axis and around at least a portion of the molding surface so as to contact and axially displace the respective molded article and remove it from the mold, and
  wherein the jaws, for the first relative motion, are linearly moveable in parallel directions radially toward and radially away from the respective mold axis, and
a drive mechanism capable of moving the jaws of each pair between the open and closed positions, and a second drive mechanism capable of axially moving the jaws, and further comprising a first carrier carrying the first jaws and a second carrier carrying the second jaws, the first and second carriers being linearly moveable according to two successive orthogonal directions, so as to displace the jaws according to their first relative motion, between their open position and their closed position on their respective molds, and their substantially axial second relative motion.

16. A method of removing a plurality of molded articles from respective molds, each mold having an external molding surface oriented according to a mold axis, said molds being arranged with their axes parallel, the method comprising the following successive steps:
  (i) aligning each mold with a respective pair of jaws, each pair of jaws including a first jaw and an opposed second jaw;
  (ii) moving the first and second jaws of each pair according to a first relative motion from an open position, wherein the first and second jaws engage the mold or the molded article, said first motion of the pairs of jaws is made linearly in parallel directions which are radial to the respective mold axis;
  (iii) moving the pairs of jaws according to a substantially axial second relative motion, wherein each pair of jaws is slidably displaced along the mold axis so as to axially displace the respective molded article and remove it from the mold,
  wherein the first jaws are carried by a first carrier and the second jaws are carried by a second carrier, and the first motion of the first and second jaws from the open position to the closed position is achieved by movement of the respective carriers.

17. A method according to claim 16, wherein the first jaws are carried by the first carrier and the second jaws are carried by the second carrier, and the substantially axial second motion of each pair of jaws is achieved by movement of the respective carriers.

18. Use of an apparatus according to claim 14 in a capsule manufacturing process for removing molded capsule parts from respective molds.

19. A method according to claim 17 utilized in a capsule manufacturing process for removing molded capsule parts from respective mold.

* * * * *